Patented Dec. 24, 1940

2,226,160

UNITED STATES PATENT OFFICE 2,226,160

COLOR STABILIZER FOR MINERAL OILS

Melvin A. Dietrich, Claymont, Del., assignor to E. I. du Pont de Nemours & Company, Wilmington, Del., a corporation of Delaware No Drawing. Application July 27, 1939, Serial No. 286,801

24 Claims. (Cl. 252—51)

This invention relates to the stabilization of mineral oils against deterioration in color, and particularly to the color stabilization of viscous petroleum oils, especially in the presence of iron. It is well known that mineral oils tend to deteriorate in color and general appearance on exposure to the action of heat and light. It is also well known that the degree of deterioration in color is catalyzed by the presence of certain metals, particularly iron. Since mineral oils are generally stored in iron or steel containers, and are used in the presence of iron surfaces, it is highly desirable to provide a product which will retain its color and satisfactory appearance over a period of time despite the deteriorating influence of these catalytic agents. Numerous materials have been disclosed in the literature as effective agents for preventing deterioration in color but the greater number of them do not function in the presence of iron.

It is an object of the present invention to provide new viscous mineral oil products which are more stable with respect to deterioration in color and appearance than those known heretofore and, in particular, are more stable in the presence of iron. Another object is to provide a method of inhibiting deterioration in color of viscous mineral oils, particularly in the presence of iron. A further object is to provide a class of compounds to be added to viscous mineral oils and which, when so added, will inhibit the deterioration in color of such oils and will be particularly effective in the presence of iron. Still further objects are to provide new compositions of matter and to advance the art. Other objects will appear hereinafter.

The above objects may be accomplished in accordance with my invention which comprises incorporating, in viscous petroleum oils, small amounts of oil-soluble compounds which are characterized by the presence of a nitrogen atom to which is attached two cyclohexyl nuclei and by at least one substituent on at least one carbon atom attached to the nitrogen, which substituent is chosen from the class of hydroxymethyl, nitrile and esters of hydroxymethyl radicals and which are otherwise free of acid reacting and basic reacting substituents. These compounds may be otherwise defined as dicyclohexylamines having at least one substituent of the class of nitrile, hydroxymethyl and aliphatic monocarboxylic acid esters of hydroxymethyl groups, which groups are bonded directly to an aliphatic carbon atom which is in turn attached directly to the amino nitrogen, said amines being otherwise free of acid reacting and basic reacting substituents.

I have found that, when such compounds are incorporated in viscous petroleum oils, they are very effective in inhibiting deterioration in color of such oils, particularly in the presence of iron.

By the term "a cyclohexyl nucleus," I mean a saturated 6-carbon atom ring which may or may not contain substituents in addition to hydrogen atoms. By the term "a dicyclohexylamine," I mean compounds containing two cyclohexyl nuclei directly attached to the same amino nitrogen. The substituents on the cyclohexyl nuclei, when present, must not be detrimental to color stabilizing action and are generally substantially neutral in character; that is, are neither acid reacting nor basic reacting. Suitable substituents are alkyl, alicyclic, alkoxy, alkyl thioether, aryloxy, aryl thioether and hydroxy groups. By the term "hydroxymethyl," I mean the group —C(R)HOH, wherein R represents hydrogen or an alkyl or alicyclic group. By the term "nitrile," I mean the group —C≡N. By the term "aliphatic monocarboxylic acid esters of hydroxy methyl groups," I mean the radical

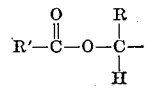

wherein R represents a hydrogen atom or an alkyl or alicyclic group and R' represents an alkyl, aralkyl or alicyclic group.

Preferably, the dicyclohexylamines, having at least one substituent of the class consisting of nitrile, hydroxymethyl and aliphatic monocarboxylic acid esters of hydroxymethyl groups, which groups are bonded directly to an aliphatic carbon atom attached directly to the amino nitrogen, which groups, attached to the amino nitrogen, otherwise consist of carbon and hydrogen, will be employed. The dicyclohexylamines, having at least one hydroxymethyl group bonded directly to an aliphatic carbon atom attached directly to the amino nitrogen, appear to be the most effective and of these, the dicyclohexylaminoalkanols in which at least one hydroxyl group of the alkanol radical is ortho to the amino nitrogen are preferred. When I refer to dicyclohexylamino compounds in which "the cyclohexyl radicals are unsubstituted" hereinafter in the specification and claims, I mean that each cyclohexyl radical has the formula

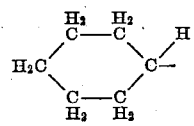

Amongst the compounds which I have found to be particularly satisfactory for my purpose are the following: beta-dicyclohexylaminoethanol.

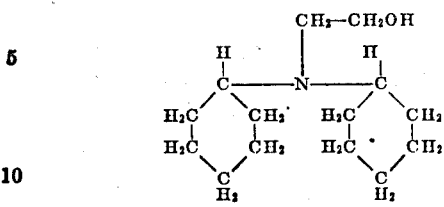

dicyclohexylaminoacetonitrile

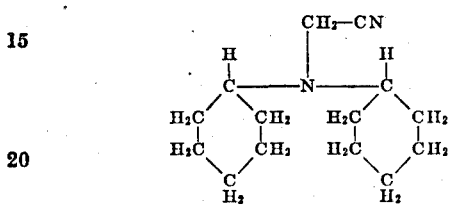

beta-dicyclohexylaminoethyl acetate

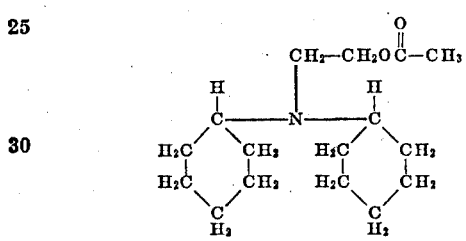

dicyclohexylaminopropanediol (mixed)

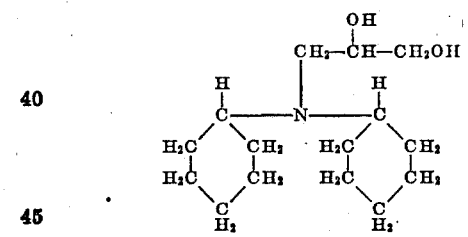

and

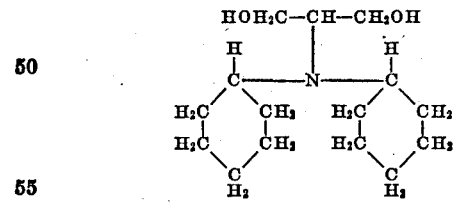

o,o'-dihydroxy-dicyclohexylamine

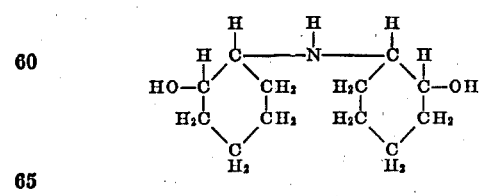

The compounds of my invention may be employed in concentrations ranging from about 0.02 to about 2% by weight based on the oil, but will preferably be employed in concentrations of from about 0.03% to 0.5%, since such amounts are usually sufficient to impart satisfactory color stability.

I have found that my compounds are effective to inhibit color deterioration of viscous mineral oils generally, but they are preferably employed in the viscous petroleum oils. By the term "viscous," I mean oils having a Saybolt Universal viscosity of at least 35 seconds at 100° F. and intend to include gas oils, Diesel fuels, white oils and greases, but to exclude the relatively non-viscous oils such as gasoline, cracked naphtha, kerosene and the like. By petroleum oils, I mean those of petroleum origin and include unrefined, refined and cracked products. My compounds may be employed in the presence of other addition agents which may be employed to improve the lubricating qualities and service performance of the oils, such as pour-point depressants, corrosion inhibitors, gum solvents, viscosity index improving agents and agents for increasing lubricity.

Two oils of S. A. E. 30 grade, one of naphthenic base and one of Mid-Continent origin, were used in evaluating the color stabilizing action of the various derivatives. Fifty grams of oil were placed in a 250 cc. beaker and heated at 300° F. for six hours in air in a well agitated oil bath. In certain experiments indicated below, 0.25 gram of iron powder was added to simulate the catalytic effect of iron surfaces. Color changes were measured on the A. S. T. M. union colorimeter. In this instrument low readings indicate light colored oils while high readings show dark colored oils. Plus or minus signs indicate that the color reading is slightly greater or slightly less than the value given. The term "dil." means that the oil was too dark-colored for direct reading and had to be diluted with naphtha to secure a reading. This dilution was taken into account in determining color increase.

In order to illustrate my invention more clearly, the preferred modes of carrying the same into effect and the advantageous results to be obtained thereby, the following examples are given:

*Example 1*

Dicyclohexylaminoethanol was tested in a naphthenic base S. A. E. 30 oil having an original color of 2½ with the following results:

| Compound | Concentration, percent by weight | Reading after test | Color increase |
|---|---|---|---|
| None | | 5− | 2½ |
| Dicyclohexylaminoethanol | 0.1 | 3 | ½+ |
| Do | 0.05 | 3+ | 1− |
| Do | 0.03 | 3½ | 1+ |

*Example 2*

Comparative performances of different color stabilizers were determined in a naphthenic base S. A. E. 30 oil having an original color of 2½ with the following results:

| Compound | Concentration, percent by weight | Color after heating | Color increase |
|---|---|---|---|
| None | | 5− | 2½ |
| Dicyclohexylaminoethanol | 0.1 | 3 | ½+ |
| Diethylaminoethanol | 0.1 | 6− | 3½ |
| Dimethylaminoethanol | 0.1 | 5+ | 3− |
| Monoethanolamine | 0.1 | 5+ | 3− |

*Example 3*

Comparative performances of different color stabilizers were determined in a Mid-Continent S. A. E. 30 oil having an orignal color of 3+ with the following results:

| Compound | Concentration, percent by weight | Color after heating | Color increase |
|---|---|---|---|
| Control | | 6— | 3— |
| Dicyclohexylaminoethanol | 0.1 | 4— | 1— |
| Di-n-butylaminoethanol | 0.1 | 8+ | 5 |
| Beta-di-n-butylaminoethanol | 0.1 | 8 | 5— |
| Gamma-di-n-butylaminoethanol | 0.1 | 8+ | 5 |

In view of the fact that oils are handled, for the most part, in iron equipment, color stability in the presence of this metal is highly important. The enormous superiority of dicyclohexylaminoethanol in this respect over previously known color stabilizers is evident in the following example.

Example 4

The color stabilizing action in presence of iron was determined in a naphthenic base S. A. E. 30 oil having an original color of 2½ with the following results:

| Compound | Concentration, percent by weight | Color | Color increase |
|---|---|---|---|
| None | | 5½ (dil.) | 11 |
| Dicyclohexylaminoethanol | 0.1 | 3+ | 1— |
| Triethanolamine | 0.1 | 3½+ (dil.) | 6½+ |
| Diethanolamine | 0.1 | 4½ (dil.) | 9— |

The stabilizing action of other properly balanced dicyclohexylamine derivatives is illustrated in Examples 5 and 6.

Example 5

The color stabilizing action of some dicyclohexylamine derivatives was determined in a naphthenic base S. A. E. 30 oil having an original color of 2½ with the following results:

| Compound | Concentration, percent by weight | Color after heating | Color increase |
|---|---|---|---|
| None | | 5½ | 3+ |
| Dicyclohexylaminoacetonitrile | 0.1 | 3½— | 1 |
| Dicyclohexylaminoethylacetate | 0.1 | 4— | 1½ |

Example 6

The color stabilizing action of other dicyclohexylamine derivatives was determined in a Mid-Continent S. A. E. 30 oil having an original color of 3+ with the following results:

| Compound | Concentration, percent by weight | Color after heating | Color increase |
|---|---|---|---|
| None | | 6— | 3— |
| Dicyclohexylaminopropanediol | 0.1 | 4 | 1— |
| O,O'-dihydroxydicyclohexylamine | 0.1 | 4+ | 1 |

From data given in Examples 2 and 3 it is evident that compounds containing the dicyclohexylamine radical, especially dicyclohexylaminoethanol, are superior to known compounds and that this superiority, as shown in Example 4, is especially pronounced in the presence of iron.

The above examples are given solely for illustrative purposes. It will be readily apparent to those skilled in the art that many variations and modifications may be made therein, particularly in the compounds employed, the substituents therein, the oils to be treated and the methods of treating the oils. For example, other compounds within my invention are: beta-(4,4'-dihydroxy) dicyclohexylaminoethanol

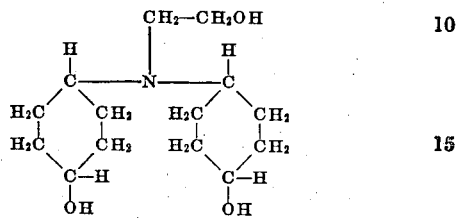

beta-(2,2'-dipropyl) dicyclohexylaminoethanol

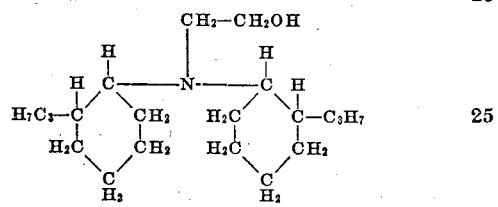

beta - (4,4'-dimethoxy) dicyclohexylaminoethanol

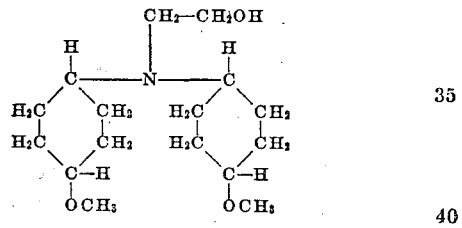

1-(dicyclohexylamino)-propanol-2

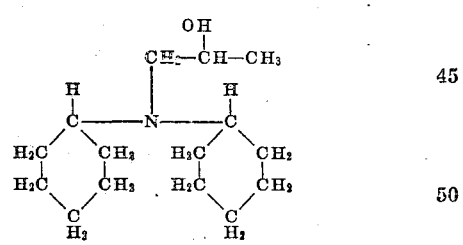

2-(dicyclohexylamino)-propanol-1

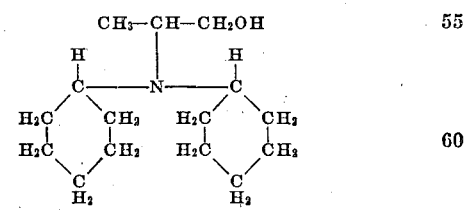

[4,4' - di(ethylthio)]dicyclohexylaminoethylbutyrate

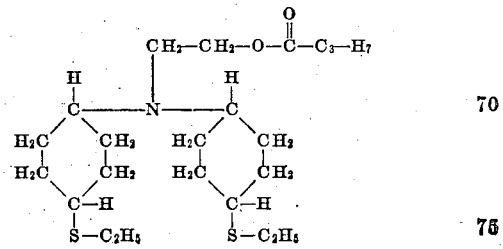

2 - (3,3' - diphenoxy) dicyclohexylaminopropane-diol-1,3

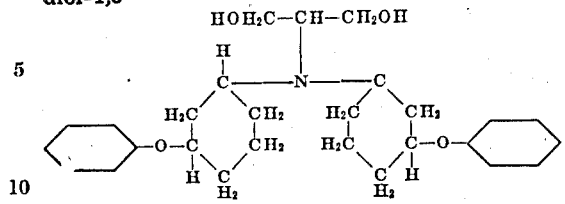

2-methyl - 2 - dicyclohexylaminopropanediol-1,3

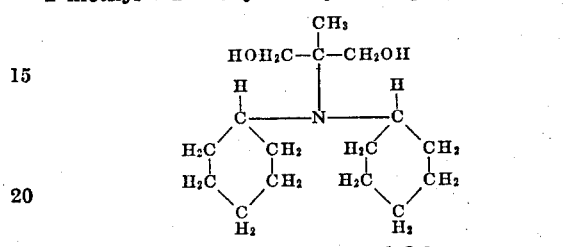

1-dicyclohexylaminopropanediol-2,3

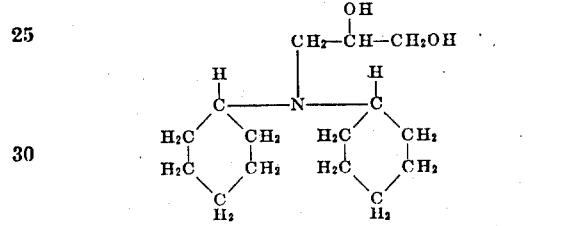

2,2' - dihydroxy - 4,4' - dipropyloxy - dicyclohexylamine

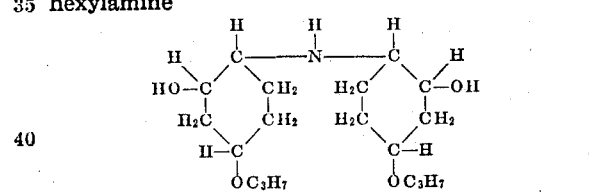

2, 2' - dihydroxy - 4,4' - diisobutyl - dicyclohexylamine

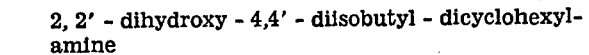

1-dicyclohexylamino-2-methyl-propanediol-2,3

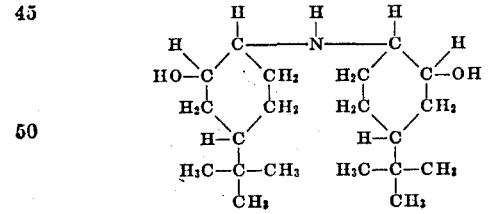

1-methyl-1-dicyclohexylaminopropanediol-2,3

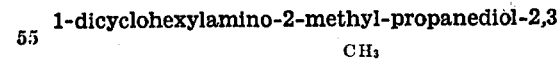

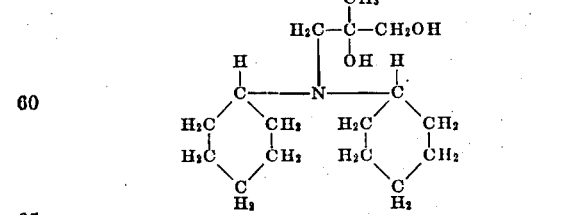

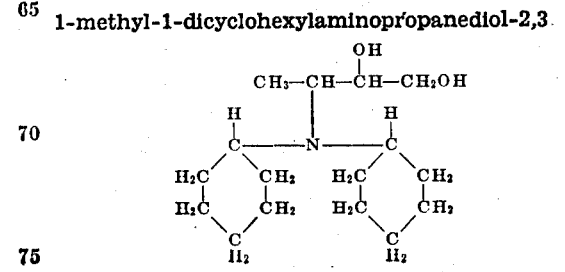

Further, mixtures of two or more of my compounds, or of one or more thereof with other known stabilizers, may be employed, if desired.

While, in the examples given above, the compounds were added to refined oils, they may be added at any suitable step in the processes of refining oils wherein they may serve to stabilize the oils and be carried through the refining operations with the oils. They may be added in very small quantities during each of the various stages of the refining process. They may be included with the refining agent, as in solvent extraction processes, and through this medium be incorporated into the oil. Also, while they are preferably employed in oils of petroleum origin, they may also be added to synthetic oils which are substantially of the hydrocarbon type, such as polymerized olefines, reaction products of chlorinated paraffin and aromatic hydrocarbons, and polymerized cracked waxes.

It will thus be apparent that by my invention, I have made it possible to produce viscous mineral oils of high color stability, particularly in the presence of metallic iron, by the addition to the oils of a new class of effective color stabilizers therefor.

I claim:

1. The method of inhibiting deterioration in color of a viscous petroleum oil which comprises incorporating in the oil a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, said amine being otherwise free of acid reacting and basic reacting substituents.

2. The method of inhibiting deterioration in color of a viscous petroleum oil which comprises incorporating in the oil a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, the groups attached to the amino nitrogen otherwise consisting of carbon and hydrogen.

3. The method of inhibiting deterioration in color of a viscous petroleum oil which comprises incorporating in the oil a small proportion of a dicyclohexylamine having at least one hydroxymethyl group bonded directly to an aliphatic carbon atom attached directly to the amino nitrogen, said amine being otherwise free of acid reacting and basic reacting substituents.

4. The method of inhibiting deterioration in color of a viscous petroleum oil which comprises incorporating in the oil a small proportion of a dicyclohexylaminoalkanol in which at least one hydroxyl group of the alkanol radical is ortho to the amino nitrogen, said amine being otherwise free of acid reacting and basic reacting substituents.

5. The method of inhibiting deterioration in color of a viscous petroleum oil which comprises incorporating in the oil a small proportion of a dicyclohexylaminoalkanol in which at least one hydroxyl group of the alkanol radical is ortho to the amino nitrogen, and the cyclohexyl radicals consist of carbon and hydrogen.

6. The method of inhibiting deterioration in color of a viscous petroleum oil which comprises incorporating in the oil a small proportion of a dicyclohexylaminoalkanol in which at least one hydroxyl group of the alkanol radical is ortho to the amino nitrogen, and the cyclohexyl radicals are unsubstituted.

7. The method of inhibiting deterioration in color of a viscous petroleum oil which comprises incorporating in the oil a small proportion of dicyclohexylaminoethanol.

8. The method of inhibiting deterioration in color of a viscous petroleum oil in the presence of iron normally effective to catalyze such deterioration, which comprises incorporating in the oil a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, said amine being otherwise free of acid reacting and basic reacting substituents.

9. The method of inhibiting deterioration in color of a viscous petroleum oil in the presence of iron normally effective to catalyze such deterioration which comprises incorporating in the oil a small proportion of a dicyclohexylamine having at least one hydroxymethyl group bonded directly to an aliphatic carbon atom attached directly to the amino nitrogen, said amine being otherwise free of acid reacting and basic reacting substituents.

10. The method of inhibiting deterioration in color of a viscous petroleum oil in the presence of iron normally effective to catalyze such deterioration, which comprises incorporating in the oil a small proportion of a dicyclohexylaminoalkanol in which at least one hydroxyl group of the alkanol radical is ortho to the amino nitrogen, said amine being otherwise free of acid reacting and basic reacting substituents.

11. The method of inhibiting deterioration in color of a viscous petroleum oil in the presence of iron normally effective to catalyze such deterioration, which comprises incorporating in the oil a small proportion of a dicyclohexylaminoalkanol in which at least one hydroxyl group of the alkanol radical is ortho to the amino nitrogen, and the cyclohexyl radicals are unsubstituted.

12. The method of inhibiting deterioration in color of a viscous petroleum oil in the presence of iron normally effective to catalyze such deterioration, which comprises incorporating in the oil a small proportion of dicyclohexylaminoethanol.

13. A viscous petroleum oil normally tending to deteriorate in color having incorporated therein a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, said amine being otherwise free of acid reacting and basic reacting substituents.

14. A viscous petroleum oil normally tending to deteriorate in color having incorporated therein a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, the groups attached to the amino nitrogen otherwise consisting of carbon and hydrogen.

15. A viscous petroleum oil normally tending to deteriorate in color having incorporated therein a small proportion of a dicyclohexylamine having at least one hydroxymethyl group bonded directly to an aliphatic carbon atom attached directly to the amino nitrogen, said amine being otherwise free of acid reacting and basic reacting substituents.

16. A viscous petroleum oil normally tending to deteriorate in color having incorporated therein a small proportion of a dicyclohexylaminoalkanol in which at least one hydroxyl group of the alkanol radical is ortho to the amino nitrogen, said amine being otherwise free of acid reacting and basic reacting substituents.

17. A viscous petroleum oil normally tending to deteriorate in color having incorporated therein a small proportion of a dicyclohexylamino alkanol in which at least one hydroxyl group of the alkanol radical is ortho to the amino nitrogen, and the cyclohexyl radicals are unsubstituted.

18. A viscous petroleum oil normally tending to deteriorate in color having incorporated therein a small proportion of dicyclohexylaminoethanol.

19. A viscous petroleum oil normally tending to deteriorate in color in the presence of iron normally tending to catalyze such deterioration, having incorporated therein a small proportion of a dicyclohexylamine having at least one substituent of the class consisting of nitrile, hydroxymethyl and aliphatic monocarboxylic acid esters of hydroxymethyl groups which groups are bonded directly to an aliphatic carbon atom attached directly to the amino nitrogen, said amine being otherwise free of acid reacting and basic reacting substituents.

20. A viscous petroleum oil normally tending to deteriorate in color in the presence of iron normally tending to catalyze such deterioration, having incorporated therein a small proportion of a dicyclohexylamine having at least one hydroxymethyl group bonded directly to an aliphatic carbon atom attached directly to the amino nitrogen, said amine being otherwise free of acid reacting and basic reacting substituents.

21. The method of inhibiting deterioration in color of a viscous petroleum oil which comprises incorporating in the oil a small proportion of dicyclohexylaminoacetonitrile.

22. The method of inhibiting deterioration in color of a viscous petroleum oil which comprises incorporating in the oil a small proportion of dicyclohexylaminoethylacetate.

23. A viscous petroleum oil normally tending to deteriorate in color having incorporated therein a small proportion of dicyclohexylaminoacetonitrile.

24. A viscous petroleum oil normally tending to deteriorate in color having incorporated therein a small proportion of dicyclohexylaminoethylacetate.

MELVIN A. DIETRICH.